United States Patent
Bunnow

[11] Patent Number: 6,024,666
[45] Date of Patent: Feb. 15, 2000

[54] DIFFERENTIAL ASSEMBLY FOR A WORK MACHINE

[75] Inventor: Marcus Bunnow, Decatur, Ill.

[73] Assignee: Caterpillar Inc, Peoria, Ill.

[21] Appl. No.: 09/204,426

[22] Filed: Dec. 3, 1998

[51] Int. Cl.[7] .................................................. F16H 48/06
[52] U.S. Cl. .......................................... 475/230; 74/424
[58] Field of Search ................................. 475/220, 230; 74/424

[56] References Cited

U.S. PATENT DOCUMENTS

| | | | |
|---|---|---|---|
| 1,241,893 | 10/1917 | Alden | 475/230 |
| 1,242,803 | 10/1917 | Herreshoff | 475/230 |
| 1,536,824 | 5/1925 | Domizi | 475/230 |
| 2,971,398 | 2/1961 | Sieving | 475/230 |
| 3,572,154 | 3/1971 | Bartolomucci | 475/230 |
| 4,543,854 | 10/1985 | Roth | 74/713 |
| 5,037,362 | 8/1991 | Teraoka et al. | 475/235 |
| 5,131,894 | 7/1992 | Hilker | 475/230 |
| 5,203,750 | 4/1993 | Oster et al. | 475/230 |
| 5,273,498 | 12/1993 | Dhillon et al. | 475/230 |
| 5,304,103 | 4/1994 | Schlosser | 475/230 |
| 5,509,862 | 4/1996 | Sherman | 475/230 |
| 5,545,102 | 8/1996 | Burgman et al. | 475/230 |

OTHER PUBLICATIONS

Drawing of a Gear GP–Differential and Bevel which is available as Caterpillar part number 135–047.

*Primary Examiner*—Dirk Wright
*Attorney, Agent, or Firm*—Maginot, Addison & Moore

[57] ABSTRACT

A differential assembly for a work machine is disclosed. The differential assembly includes a differential enclosure having a side wall and a shaft extending from the side wall. The differential assembly also includes a drive gear having a gear bore defined therein. The drive gear is positioned relative to the shaft such that the shaft extends into the gear bore. The differential assembly further includes a gear shaft extending from the drive gear. The gear shaft has a differential axle cavity defined therein. The differential assembly also includes a differential axle positioned within the differential axle cavity. The differential assembly further includes a forward bearing assembly positioned within the gear bore such that the forward bearing assembly is interposed between a wall segment of the gear bore and the shaft, whereby the drive gear is capable of rotating relative to the differential enclosure. The forward bearing assembly includes (i) a forward cup, (ii) a forward cone, and (iii) a number of forward rollers interposed between the forward cup and the forward cone. The forward cup is secured to the drive gear such that no relative rotational movement occurs therebetween. The forward cone is secured to the shaft such that no relative rotational movement occurs therebetween.

19 Claims, 2 Drawing Sheets

FIG.2

DIFFERENTIAL ASSEMBLY FOR A WORK MACHINE

TECHNICAL FIELD OF THE INVENTION

The present invention relates generally to a differential assembly of a work machine, and more particularly to an arrangement for mounting a drive gear of a differential assembly of a work machine.

BACKGROUND OF THE INVENTION

Work machines, such as mining trucks, typically include a left wheel axle, a right wheel axle, and a differential assembly which mechanically couples the right and left wheel axles. The differential assembly allows the right and left axles to rotate at different speeds relative to one another as the work machine is driven in a curved path.

The differential assembly typically includes a drive gear mounted within a differential enclosure via a pair of bearing assemblies. In particular, the drive gear has a pair of shafts extending therefrom, and one bearing assembly is disposed around each shaft such that the drive gear is rotatably secured to the differential enclosure.

A problem with the above described arrangement is that there is a limited amount of space available within the interior of the differential enclosure and the shafts extending from the drive gear occupy a significant amount of this space. As a result, relatively small bearing assemblies must be utilized to secure the drive gear to the differential enclosure. The relatively small bearing assemblies are more susceptible to mechanical failure under the loads they are subjected to during the use of the differential assembly. Having bearing assemblies which are more susceptible to mechanical failure increases the maintenance cost of the work machine.

What is needed therefore is a differential assembly which overcomes the above-mentioned drawback.

DISCLOSURE OF THE INVENTION

In accordance with a first embodiment of the present invention, there is provided a differential assembly for a work machine. The differential assembly includes a differential enclosure having a side wall. The differential assembly also includes a shaft extending from the side wall. The differential assembly further includes a drive gear having a gear bore defined therein. The drive gear is positioned relative to the shaft such that the shaft extends into the gear bore. The differential assembly also includes a forward bearing assembly positioned within the gear bore such that the forward bearing assembly is interposed between a wall segment of the gear bore and the shaft, whereby the drive gear is capable of rotating relative to the differential enclosure.

In accordance with a second embodiment of the present invention, there is provided a differential assembly for a work machine. The differential assembly includes a differential enclosure having an enclosure cavity. The differential assembly also includes a drive gear having a gear bore defined therein, the drive gear being positioned within the enclosure cavity. The differential assembly further includes a forward bearing assembly positioned within the gear bore. The forward bearing assembly has (i) a forward cup, (ii) a forward cone, (iii) a number of forward rollers interposed between the forward cup and the forward cone, and (iv) a first taper direction. The differential assembly also includes a rearward bearing assembly secured to the drive gear. The rearward bearing assembly has (i) a rearward cup, (ii) a rearward cone, (iii) a number of rearward rollers interposed between the rearward cup and the rearward cone, and (iv) a second taper direction, wherein the first taper direction and the second taper direction are the same.

In accordance with a third embodiment of the present invention there is provided a work machine. The work machine includes a differential assembly having (i) a differential enclosure having a side wall, (ii) a shaft extending from the side wall, (iii) a drive gear having a gear bore defined therein, the drive gear being positioned relative to the shaft such that the shaft extends into the gear bore, and (iv) a forward bearing assembly positioned within the gear bore such that the forward bearing assembly is interposed between a wall segment of the gear bore and the shaft, whereby the drive gear is capable of rotating relative to the differential enclosure. The forward bearing assembly includes (i) a forward cup, (ii) a forward cone, and (iii) a number of forward rollers interposed between the forward cup and the forward cone. The forward cup is secured to the drive gear such that no relative rotational movement occurs therebetween. The forward cone is secured to the shaft such that no relative rotational movement occurs therebetween.

BEST MODE FOR CARRYING OUT THE INVENTION

Figure 1:
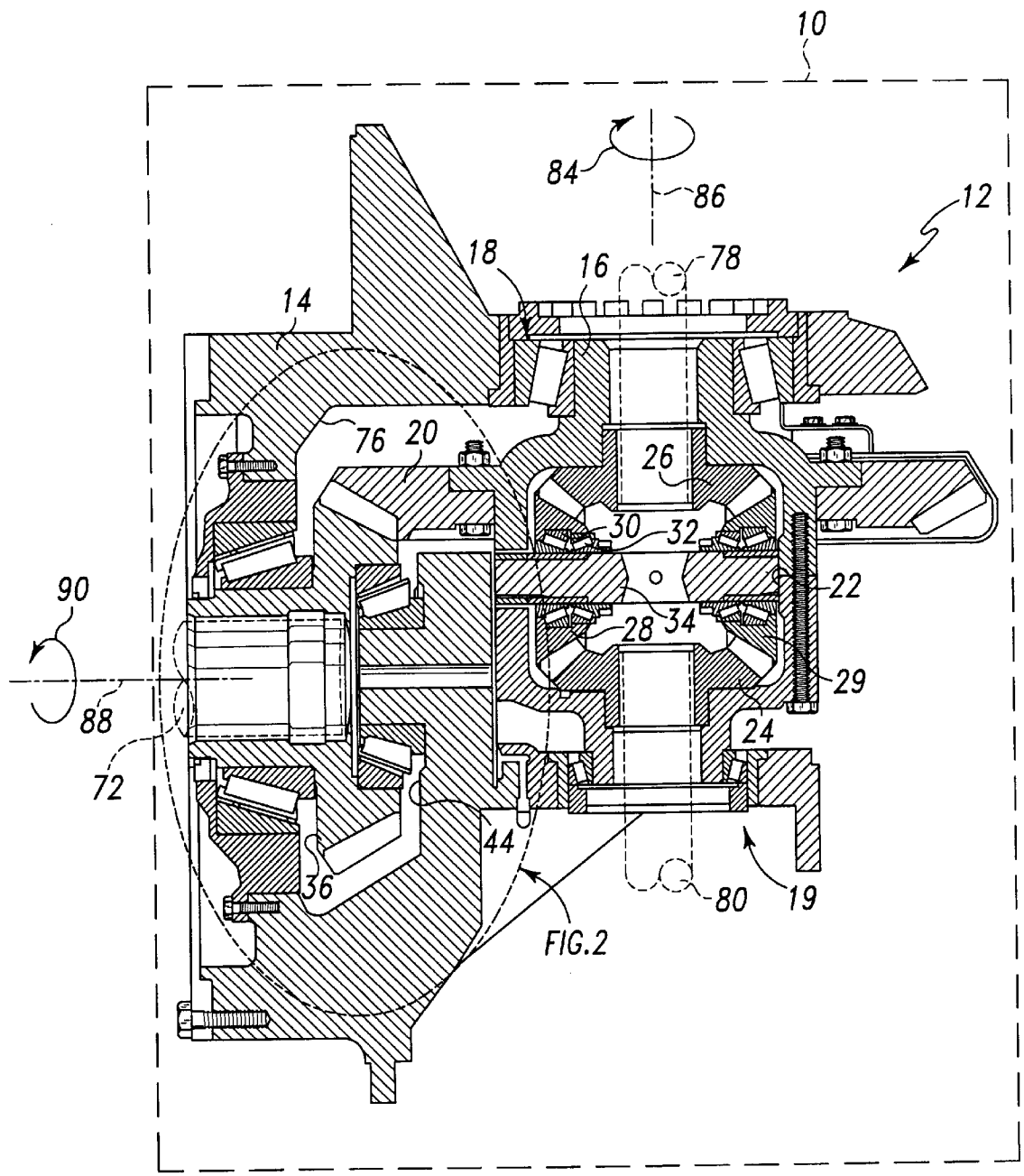
FIG. 1 is a partial schematic, partial fragmentary cross sectional view of a work machine having a differential assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
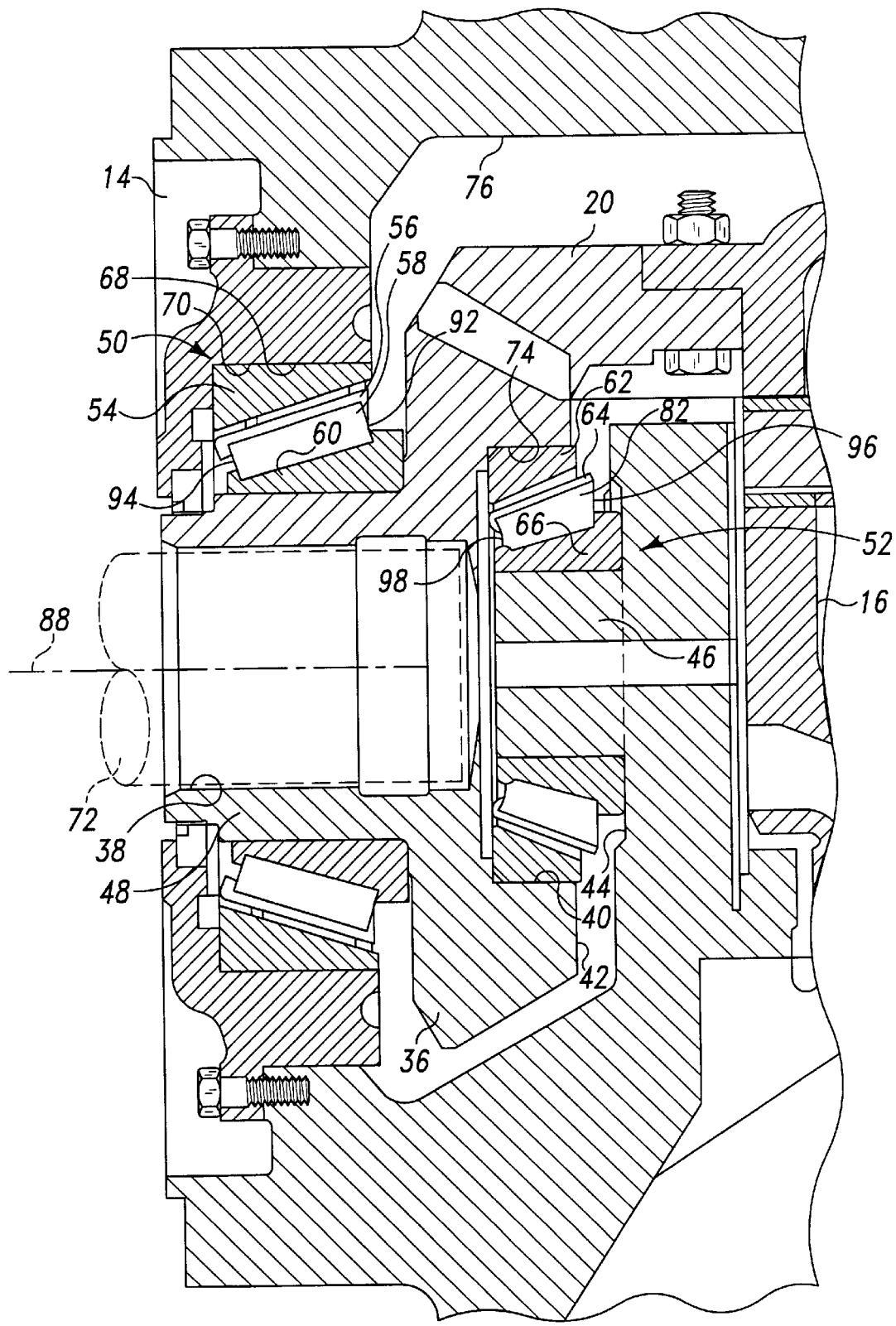
FIG. 2 is an enlarged view of a portion of FIG. 1 which is encircled and indicated as FIG. 2.

Referring now to FIGS. 1 and 2, there is shown a work machine 10 which incorporates the features of the present invention therein. Work machine 10 includes a differential assembly 12. Differential assembly 12 includes a differential enclosure 14 which defines an enclosure cavity 76. Differential assembly 12 also includes a drive gear 36, a forward bearing assembly 52 (see FIG. 2), and a rearward bearing assembly 50 (see FIG. 2). Differential assembly 12 further includes a differential housing 16 having a housing chamber 22, a housing gear 20, a pair of side gears 24 and 26, and a pair of wheel axles 78 and 80. Differential assembly 12 also includes a pair of pinion gears 28 and 29, roller bearing assemblies 18, 19, 30, and 32, a spider member 34, and a differential axle 72.

As shown more clearly in FIG. 2, differential enclosure 14 has a side wall 44 and a shaft 46. Shaft 46 extends from side wall 44 such that shaft 46 is positioned within enclosure cavity 76. Differential enclosure 14 also has a wall segment 70 which defines a shaft channel 68. Shaft channel 68 leads to enclosure cavity 76.

Drive gear 36 has a gear face 42 with a gear bore 40 defined therein. Drive gear 36 also has a gear shaft 48 extending therefrom. Gear shaft 48 has a differential axle cavity 38 defined therein.

Forward bearing assembly 52 includes a forward cup 62, a forward cone 66, and a number of forward rollers 82 interposed between forward cup 62 and forward cone 66. Forward bearing assembly 52 also includes a cage 64 for maintaining forward rollers 82 interposed between forward cup 62 and forward cone 66. Similarly, rearward bearing assembly 50 includes a rearward cup 54, a rearward cone 60, and a number of rearward rollers 58 interposed between rearward cup 54 and rearward cone 60. Rearward bearing assembly 50 also includes a cage 56 for maintaining rearward rollers 58 interposed between rearward cup 54 and rearward cone 60.

Drive gear 36 is positioned within enclosure cavity 76 of differential enclosure 14 such that shaft 46 extends into gear bore 40. Drive gear 36 is further positioned within enclosure cavity 76 such that gear shaft 48 extends into shaft channel 68.

Forward bearing assembly 52 is positioned within gear bore 40 such that forward bearing assembly 52 is interposed between a wall segment 74 of gear bore 40 and shaft 46. In particular, forward cup 62 is press fit into gear bore 40 such that forward cup 62 contacts wall segment 74. It should be understood that press fitting forward cup 62 into gear bore 40 in the above described manner secures forward cup 62 to drive gear 36 such that no relative rotational movement occurs therebetween. Forward cone 66 is press fit over shaft 46 such that no relative rotational movement occurs therebetween.

Rearward bearing assembly 50 is disposed around gear shaft 48 such that rearward bearing assembly 50 is interposed between gear shaft 48 and wall segment 70 of said shaft channel 68. In particular, rearward cup 54 is press fit into shaft channel 68 such that rearward cup 54 contacts wall segment 70. It should be understood that press fitting rearward cup 54 into shaft channel 68 in the above described manner secures rearward cup 54 to differential enclosure 14 such that no relative rotational movement occurs therebetween. Rearward cone 60 is press fit over gear shaft 48 such that no relative rotational movement occurs therebetween.

Arranging drive gear 36, rearward bearing assembly 50, and forward bearing assembly 52 in the above described manner secures drive gear 36 to differential enclosure 14. In addition, drive gear 36 is capable of rotating relative to differential enclosure 14 around an axis of rotation 88.

Differential axle 72 is positioned within differential axle cavity 38 such that differential axle 72 is mechanically coupled to drive gear 36. Rotation of differential axle 72 around axis of rotation 88 also causes the rotation of drive gear 36 around axis of rotation 88.

Referring back to FIG. 1, differential housing 16 is secured to differential enclosure 14 via roller bearing assemblies 18 and 19 such that differential housing 16 is capable of rotating relative to differential enclosure 14 around axis 86. Housing gear 20 is secured to differential housing 16 so that housing gear 20 meshingly engages drive gear 36.

Side gears 24 and 26 are positioned within housing chamber 22 of differential housing 16. Wheel axle 78 is inserted into housing chamber 22 and mechanically coupled to side gear 26. Wheel axle 80 is inserted into housing chamber 22 and mechanically coupled to side gear 24. Spider member 34 is also positioned within housing chamber 22 such that spider member 34 is interposed between side gears 24 and 26.

Pinion gear 28 is mounted on a portion of spider member 34 via roller bearing assembly 30 and roller bearing assembly 32. Specifically, roller bearing assemblies 30 and 32 are interposed between pinion gear 28 and spider member 34 such that pinion gear 28 can rotate relative to spider member 34. Pinion gear 29 is mounted onto another portion of spider member 34 in a substantially identical manner as described for pinion gear 28 via another pair of roller bearing assemblies. Pinion gear 29 can also rotate relative to spider member 34.

During use of differential assembly 12, the rotation of differential axle 72 around axis of rotation 88 in the direction of arrow 90 causes the rotation of drive gear 36 in the same direction. Rotation of drive gear 36 in the above described manner causes housing gear 20 to rotate around axis 86 in a direction indicated by arrow 84. Rotation of housing gear 20 as described above causes the rotation of differential housing 16 in the same direction. Rotation of differential housing 16 allows wheel axle 78 and wheel axle 80 to rotate at different speeds relative to one another as the work machine 10 is driven in a curved path.

Industrial Applicability

It should be understood that arranging forward bearing assembly 52 and rearward bearing assembly 50 in the above described manner results in forward bearing assembly 52 and rearward bearing assembly 50 having the same taper direction. In particular, as shown in FIG. 2, each rearward roller 58 of rearward bearing assembly 50 has an inboard end 92 and an outboard end 94. In a similar manner, each forward roller 82 of forward bearing assembly 52 has an inboard end 96 and an outboard end 98. Arranging rearward bearing assembly 50 such that rearward cup 54 is secured to differential enclosure 14 and rearward cone 60 is secured to gear shaft 48 results in each rearward roller 58 being positioned at an angle relative to axis of rotation 88. Specifically, each rearward roller 58 is positioned at an angle relative to axis of rotation 88 such that (i) each inboard end 92 of each rearward roller 58 is tilted away from axis of rotation 88 and (ii) each outboard end 94 of each rearward roller 58 is tilted toward axis of rotation 88. Moreover, arranging forward bearing assembly 52 such that forward cup 62 is secured to drive gear 36 and forward cone 66 is secured to shaft 46 results in each forward roller 82 of forward bearing assembly 52 being positioned at an angle relative to axis of rotation 88 in a manner that is substantially identical to that described above for rearward rollers 58. In particular, each forward roller 82 is positioned at an angle relative to axis of rotation 88 such that (i) each inboard end 96 of each forward roller 82 is tilted away from axis of rotation 88 and (ii) each outboard end 98 of each forward roller 58 is tilted toward axis of rotation 88. It should be appreciated that how the rearward rollers 58 and forward rollers 82 are tilted or angled relative to axis of rotation 88 defines the taper direction of rearward roller bearing assembly 50 and forward bearing assembly 52, respectively. Therefore, having rearward rollers 58 spatially orientated relative to axis of rotation 88 in a substantially identical manner as forward rollers 82 results in forward bearing assembly 52 and rearward bearing assembly 50 having the same taper direction. However, other spatial orientations are contemplated as long as the taper direction of rearward roller bearing assembly 50 and forward bearing assembly 52 are substantially the same. For example, (i) each inboard end 96 of each forward roller 82 could be tilted toward axis of rotation 88 and each outboard end 98 of each forward roller 58 could be tilted away from axis of rotation 88 and (ii) each inboard end 92 of each rearward roller 58 could be tilted toward axis of rotation 88 and each outboard end 94 of each rearward roller 58 could be tilted away from axis of rotation 88. The above described example of an alternative spatial arrangement would also result in rearward roller bearing assembly 50 and forward bearing assembly 52 having the same taper direction.

Positioning rearward bearing assembly 50 and forward bearing assembly 52 so as to have the same taper direction is an important aspect of the present invention. In particular, having the same taper direction decreases the mechanical stress communicated to drive gear 36 via rearward bearing assembly 50 and forward bearing assembly 52. Decreasing the mechanical stress on drive gear 36 decreases the maintenance costs for differential assembly 12.

This is in contrast to other differential assembly designs which do not include a drive gear mounted on bearing assemblies which have the same taper direction. These designs communicate a relatively greater amount of stress to the drive gear as compared to the present invention. As a result, these differential assembly designs are more prone to having a mechanical failure.

In addition, it should be appreciated that mounting drive gear 36 within differential enclosure 14 such that forward bearing assembly 52 and shaft 46 are positioned within gear bore 40 is another important aspect of the present invention. Specifically, this arrangement saves space within enclosure cavity 76 as compared to other differential assembly designs. As a result, larger forward and rearward bearing assemblies 50 and 52 can be utilized in differential assembly 12 which increases the structural strength thereof. Having structurally robust forward and rearward bearing assemblies 50 and 52 decreases the probability of having a mechanical failure which decreases the maintenance cost for work machine 10.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A differential assembly for a work machine, comprising:
   a differential enclosure having a side wall;
   a shaft extending from said side wall;
   a drive gear having a gear bore defined therein, said drive gear being positioned relative to said shaft such that said shaft extends into said gear bore; and
   a forward bearing assembly positioned within said gear bore such that said forward bearing assembly is interposed between a wall segment of said gear bore and said shaft, whereby said forward bearing assembly facilitates rotation of said drive gear relative to said differential enclosure.

2. The differential assembly of claim 1, wherein:
   said forward bearing assembly includes (i) a forward cup, (ii) a forward cone, and (iii) a number of forward rollers interposed between said forward cup and said forward cone,
   said forward cup is secured to said drive gear such that no relative rotational movement occurs therebetween, and
   said forward cone is secured to said shaft such that no relative rotational movement occurs therebetween.

3. The differential assembly of claim 2, further comprising a rearward bearing assembly, wherein:
   said differential enclosure has a shaft channel defined therein,
   said drive gear has a gear shaft extending therefrom,
   said drive gear is positioned relative to said differential enclosure such that said gear shaft extends into said shaft channel, and
   said rearward bearing assembly is disposed around said gear shaft such that said rearward bearing assembly is interposed between said gear shaft and a wall segment of said shaft channel.

4. The differential assembly of claim 3, wherein:
   said rearward bearing assembly has (i) a rearward cup, (ii) a rearward cone, and (iii) a number of rearward rollers interposed between said rearward cup and said rearward cone,
   said rearward cup is secured to said differential enclosure such that no relative rotational movement occurs therebetween, and
   said rearward cone is secured to said gear shaft such that no relative rotational movement occurs therebetween.

5. The differential assembly of claim 1, wherein:
   said drive gear has a gear shaft extending therefrom,
   said gear shaft has a differential axle cavity defined therein, and
   a differential axle is positioned within said differential axle cavity.

6. The differential assembly of claim 1, further comprising (i) a differential housing which is secured to said differential enclosure and (ii) a housing gear attached to said differential housing, wherein:
   said drive gear meshingly engages said housing gear such that rotation of said drive gear relative to said differential enclosure causes said housing gear and said differential housing to rotate relative to said differential enclosure.

7. The differential assembly of claim 6, further comprising:
   a side gear positioned within a housing chamber of said differential housing; and
   a wheel axle mechanically coupled to said side gear.

8. A differential assembly for a work machine, comprising:
   a differential enclosure having an enclosure cavity;
   a drive gear having a gear bore defined therein, said drive gear being positioned within said enclosure cavity;
   a forward bearing assembly positioned within said gear bore, said forward bearing assembly having (i) a forward cup, (ii) a forward cone, and (iii) a number of forward rollers interposed between said forward cup and said forward cone; and
   a rearward bearing assembly secured to said drive gear, said rearward bearing assembly having (i) a rearward cup, (ii) a rearward cone, and (iii) a number of rearward rollers interposed between said rearward cup and said rearward cone,
   wherein said forward bearing assembly is configured to define a first taper direction,
   wherein said rearward bearing assembly is configured to define a second taper direction, and
   wherein said first taper direction and said second taper direction are the same.

9. The differential assembly of claim 8, wherein:
   said differential enclosure has a side wall with a shaft extending therefrom,
   said drive gear is positioned relative to said shaft such that (i) said shaft is positioned within said gear bore and (ii)

said forward bearing assembly is interposed between said shaft and a wall segment of said gear bore, said forward cup is secured to said drive gear such that no relative rotational movement occurs therebetween, and said forward cone is secured to said shaft such that no relative rotational movement occurs therebetween.

10. The differential assembly of claim 8, wherein:

said differential enclosure has a shaft channel defined therein, said drive gear has a gear shaft extending therefrom, said drive gear is positioned relative to said differential enclosure such that said gear shaft extends into said shaft channel, and said rearward bearing assembly is disposed around said gear shaft such that said rearward bearing assembly is interposed between said gear shaft and a wall segment of said shaft channel.

11. The differential assembly of claim 10, wherein:

said rearward cup is secured to said differential enclosure such that no relative rotational movement occurs therebetween, and said rearward cone is secured to said gear shaft such that no relative rotational movement occurs therebetween.

12. The differential assembly of claim 8, further comprising:

a differential housing secured to said differential enclosure; and a housing gear attached to said differential housing, wherein said drive gear meshingly engages said housing gear such that rotation of said drive gear relative to said differential enclosure causes said housing gear and said differential housing to rotate relative to said differential enclosure.

13. The differential assembly of claim 12, further comprising:

a side gear positioned within a housing chamber of said differential housing; and a wheel axle mechanically coupled to said side gear.

14. A work machine, comprising:

a differential assembly which includes (i) a differential enclosure having a side wall, (ii) a shaft extending from said side wall, (iii) a drive gear having a gear bore defined therein, said drive gear being positioned relative to said shaft such that said shaft extends into said gear bore, and (iv) a forward bearing assembly positioned within said gear bore such that said forward bearing assembly is interposed between a wall segment of said gear bore and said shaft, whereby said forward bearing assembly facilitates rotation of said drive gear relative to said differential enclosure, wherein said forward bearing assembly includes (i) a forward cup, (ii) a forward cone, and (iii) a number of forward rollers interposed between said forward cup and said forward cone, wherein said forward cup is secured to said drive gear such that no relative rotational movement occurs therebetween, and wherein said forward cone is secured to said shaft such that no relative rotational movement occurs therebetween.

15. The differential assembly of claim 14, further comprising a rearward bearing assembly, wherein:

said differential enclosure has a shaft channel defined therein, said drive gear has a gear shaft extending therefrom, said drive gear is positioned relative to said differential enclosure such that said gear shaft extends into said shaft channel, and said rearward bearing assembly is disposed around said gear shaft such that said rearward bearing assembly is interposed between said gear shaft and a wall segment of said shaft channel.

16. The differential assembly of claim 15, wherein:

said rearward bearing assembly has (i) a rearward cup, (ii) a rearward cone, and (iii) a number of rearward rollers interposed between said rearward cup and said rearward cone, said rearward cup is secured to said differential enclosure such that no relative rotational movement occurs therebetween, and said rearward cone is secured to said gear shaft such that no relative rotational movement occurs therebetween.

17. The differential assembly of claim 14, wherein:

said drive gear has a gear shaft extending therefrom, said gear shaft has a differential axle cavity defined therein, and a differential axle is positioned within said differential axle cavity.

18. The differential assembly of claim 14, further comprising (i) a differential housing positioned within an enclosure cavity of said differential enclosure and (ii) a housing gear attached to said differential housing, wherein:

said drive gear meshingly engages said housing gear such that rotation of said drive gear relative to said differential enclosure causes said housing gear and said differential housing to rotate relative to said differential enclosure.

19. The differential assembly of claim 18, further comprising:

a side gear positioned within a housing chamber of said differential housing; and a wheel axle mechanically coupled to said side gear.

* * * * *